United States Patent
Tang

(10) Patent No.: US 6,885,531 B2
(45) Date of Patent: Apr. 26, 2005

(54) OVER-CURRENT PROTECTION CIRCUIT

(75) Inventor: Pak Chong Tang, Knoxville, TN (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 249 days.

(21) Appl. No.: 09/933,555

(22) Filed: Aug. 20, 2001

(65) Prior Publication Data

US 2002/0122281 A1 Sep. 5, 2002

Related U.S. Application Data

(60) Provisional application No. 60/275,393, filed on Mar. 13, 2001.

(51) Int. Cl.$^7$ .............................. H04N 5/68; H02H 3/08
(52) U.S. Cl. ...................................... 361/93.1; 348/380
(58) Field of Search ................................ 361/93.1, 93.9, 361/91.1, 101, 86, 88, 90; 348/380, 381, 377, 378, 379; 363/67, 68; 358/74, 65, 220, 171

(56) References Cited

U.S. PATENT DOCUMENTS

| | | | | |
|---|---|---|---|---|
| 4,017,681 A | | 4/1977 | Smeulers et al. ............ 358/171 |
| 4,599,643 A | * | 7/1986 | Harlan ........................ 348/380 |
| 5,043,639 A | * | 8/1991 | Gurley et al. ................ 315/386 |
| 5,889,557 A | * | 3/1999 | Sato ............................ 348/380 |
| 5,920,474 A | * | 7/1999 | Johnson et al. ............. 363/126 |
| 6,008,842 A | * | 12/1999 | Nagata ........................ 348/173 |

* cited by examiner

Primary Examiner—Pia Tibbits
(74) Attorney, Agent, or Firm—Edward W. Goodman

(57) ABSTRACT

An over-current protection circuit is used to prevent damage to a television receiver due to excessive beam current. The television receiver includes a high voltage generating circuit for supplying a beam current to a picture tube. The over-current protection circuit a measurement circuit for directly detecting the beam current, a comparison circuit for comparing the detected beam current with a predefined threshold level, and an output circuit coupled to a control input of the high voltage generating circuit, for generating a control signal for turning off the high voltage generating circuit.

8 Claims, 2 Drawing Sheets

_US 6,885,531 B2_

OVER-CURRENT PROTECTION CIRCUIT

CROSS-REFERENCE TO RELATED APPLICATIONS

THIS APPLN CLAIMS BENEFIT OF 60/275,393, filed Mar. 13, 2001.

BACKGROUND OF THE INVENTION

1. Field of the Invention

The subject invention relates to television receivers, and more particularly, to preventing the beam current in television receivers from exceeding a predefined maximum amount.

2. Description of the Related Art

FIG. 1 shows the high voltage circuitry in a known projection television receiver. The high voltage output/driver circuit 10, under the control of a high voltage drive pulse, applies a B+ voltage of 130 V. to a primary winding L1 of a high voltage transformer 20, the primary winding L1 being connected to ground via a capacitor C1. The high voltage transformer 20 includes a plurality of secondary windings L2–L5 serially connected by diodes D1–D3. A diode D4 connects the free end of secondary winding L5 to the input of a high voltage splitter 30 which applies anode voltages to the red, green and blue projection tubes (not shown). Diode D2, in addition to being connected to the secondary winding L4, is also connected to a main focus output 22 of the high voltage transformer 20. A power supply voltage Vb is connected to the free end of secondary winding L5 via a series resistor R1 and across a capacitor C2 connected to ground, and supplies the beam current Ib. This beam current Ib is also supplied to an automatic beam current limiting (ABL) circuit (not shown)

Virtually every television receiver has an automatic beam current limiting, ABL, circuit. Its function is to limit the maximum beam current that is necessary to produce a bright picture on the screen when the brightness and the picture (contrast) controls are at maximum. In general, the object of an ABL circuit is to keep the maximum beam current below, for example, 1.8 ma. U.S. Pat. No. 4,017,681 shows a typical beam current limiting circuit.

When the brightness or contrast increases, more beam current, Ib, is drawn from the power supply, Vb, through the resistor R1 into the secondary winding L5 of the high voltage transformer 20, the high voltage splitter 30 and the anodes of projection tubes. Any amount of beam current in excess of, for example, 1.8 ma should be kept to a minimum so that the high voltage transformer 20 and the projection tubes will operate reliably. Otherwise, the high voltage transformer 20 and/or the projection tubes may fail leading to the costs for replacing these components which are expensive. In addition, too much beam current may cause the projection tubes to emit too much X-ray radiation which is harmful to health. To this end, the ABL circuit detects the power supply voltage Vb and correspondingly limits the luminance and chrominance drive circuits which, in turn, limits the brightness and contrast of the television receiver.

When the ABL circuit fails due to, for example, a failed component therein, or when the picture tube is zero biased, or both, a large amount of beam current over 1.8 ma will result. The high voltage output circuit C should then be disabled. As such, there will be no beam current. An over-current protection circuit is used to disable the high voltage output circuit when the beam current exceeds the maximum beam current by a certain percentage.

FIG. 1 shows an over-current protection circuit which uses a switching circuit 40 (e.g., IC SC78130P1 by Motorola) to disables the high voltage output circuit. In particular, the high voltage transformer 20 includes an auxiliary winding L6 which applies a flyback pulse, through a series arrangement of a diode D5 and a resistor R2, to input 3 of the switching circuit 40. Input 3 is connected to ground via a resistor R3 and a capacitor C3, and is also connected to an input 1 via a resistor R4. Input 4 is connected to ground and inputs 2 and 8 are connected to ground via capacitors C4 and C5, respectively. A supply voltage of +15 V. is applied to input 8 via a resistor R5. In addition, an on/off signal is applied to input 7 via a resistor R6. Finally, an output 8 of the switching circuit 40 is connected to a control input of the high voltage output/drive circuit 10.

The over-current protection circuit of FIG. 1 relies on the change of the voltage amplitude of the flyback pulse on the auxiliary winding L6 of the high voltage transformer 20. When the beam current increases, the amplitude of the flyback pulse decreases. When there is excessive beam current over 1.8 ma, the voltage amplitude of the flyback pulse decreases to such a low amplitude that, after it is rectified by diode D5 and the capacitor C3, the d.c. voltage at input 1 is less than the reference voltage at input 2. This actives the switching circuit 40 and causes the high voltage output/drive circuit 10 to shut down and to be latched.

Applicant notes, however, that this system does not monitor the beam current directly because the change of voltage amplitude of the flyback pulse at the auxiliary winding L6 of the high voltage transformer 20 does not directly track the exact change of the beam current. Furthermore, the amplitude of the flyback pulse will change due to the changing of the flyback time or due to the tolerances between transformers. Therefore, the exact amount of beam current over 1.8 ma cannot be tightly controlled and predicted precisely.

SUMMARY OF THE INVENTION

It is an object of the invention to provide an over-current protection circuit that directly tracks the beam current in a television receiver.

This object is achieved in an over-current protection circuit for preventing damage to a television receiver due to excessive beam current, said television receiver including a high voltage generating circuit for supplying a beam current to a picture tube, said high voltage generating circuit having a control input, wherein said over-current protection circuit comprises means for directly detecting the beam current; means for comparing the detected beam current with a predefined threshold level; and means, coupled to the control input of said high voltage generating circuit, for generating a control signal for turning off said high voltage generating circuit.

It is a further object of the invention to provide an over-current protection circuit that is immune to tolerance changes in the high voltage transformer, and is capable of accurately controlling and precisely predicting the amount by which the actual beam current exceeds a predetermined maximum amount.

Applicant has found that the beam current power supply voltage is directly proportional to the beam current. Hence, by monitoring the change of this voltage, the amount of change of the beam current can be directly determined.

In a further embodiment of the invention, the generating means latches said high voltage generating circuit in an off state. Arranged as such, the over-current protection circuit prevents the high voltage generating circuit from being turned on again when the beam current drops, at least until power has been removed from the television receiver. As such, re-starting of the television receiver must be a conscious act by the consumer.

In a further embodiment of the invention, the over-current protection circuit further comprises means for generating a reference signal equivalent to said threshold level; and temperature compensating means for making said reference signal temperature independent. Arranged as such, the over-current protection circuit is able to precisely predict the beam current without regard to temperature.

In a further embodiment of the invention, the over-current protection circuit further comprises means for preventing said generating means from erroneously generating said control signal due to picture tube arcing and/or random noise.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
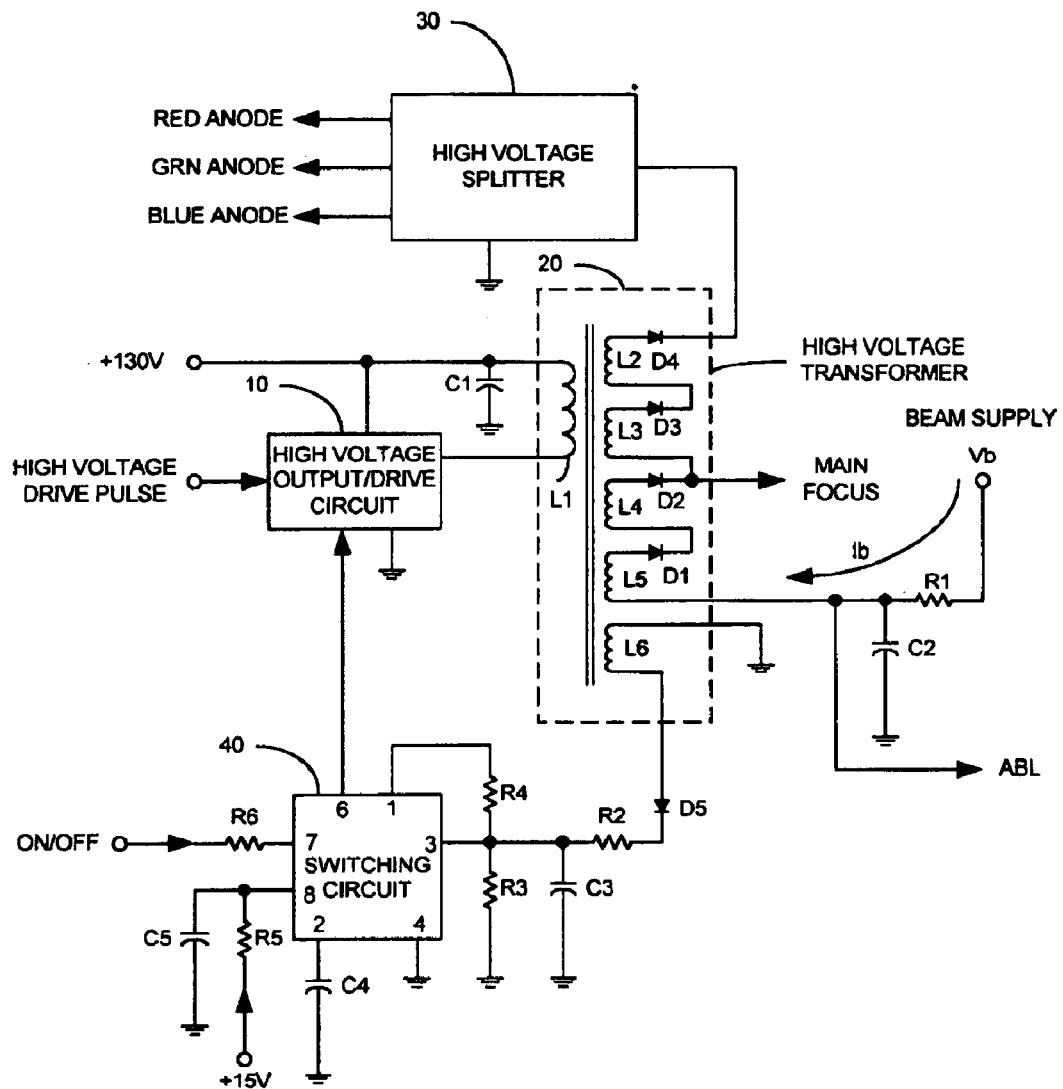
FIG. 1 shows schematic block diagram of a prior art over-current protection circuit for a projection television receiver.
Figure 2:
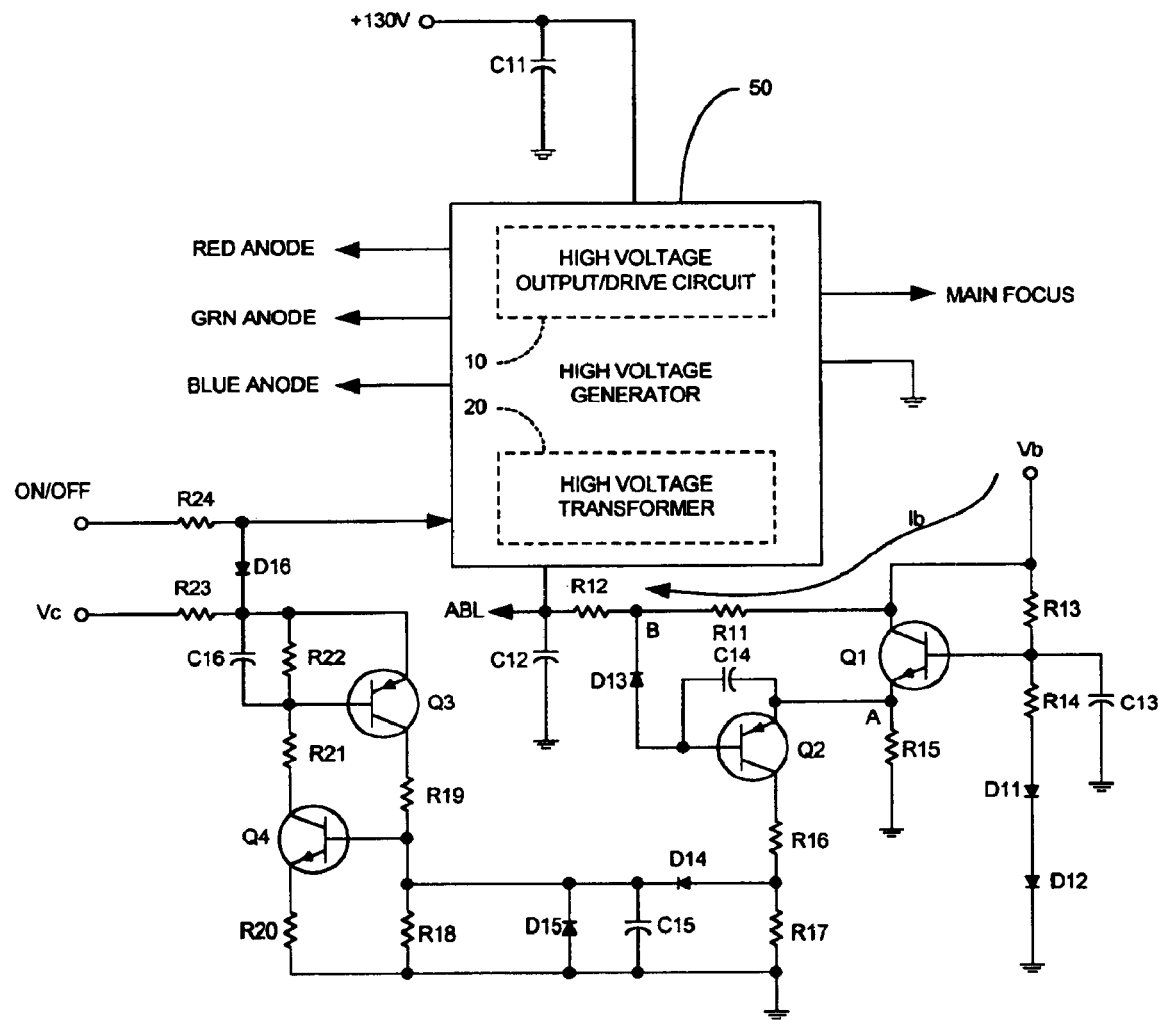
FIG. 2 shows a schematic block diagram of an over-current protection circuit in accordance with the subject invention.

As shown in FIG. 2, a projection television receiver includes a high voltage generator 50 which may comprise the high voltage output/drive circuit 10 and the high voltage transformer 20 of FIG. 1. An input of the high voltage generator 50 receives the B+ voltage of 130 V. which is connected to ground via a capacitor C11. One output of the high voltage generator 50 constitutes the main focus output, while three other outputs carry the anode voltages for the red, green and blue projection tubes. The beam current Ib is applied at input 2, and results from the application of the beam supply voltage Vb to the series arrangement of resistors R11, R12 and capacitor C12, the junction between resistor R12 and capacitor C12 being connected to the input 2. This input 2 is also connected to an automatic beam current limiting (ABL) circuit (not shown). For a fixed value of R1, the amount of change of the voltage B (at the junction between resistors R11 and R12) is directly proportional to the amount of change of the beam current. Therefore, by monitoring the change of the voltage B, the amount of change of the beam current can be directly determined. For example, if R11 is 3300 ohms, the beam supply voltage Vb is 28 V. and the beam current is 1.8 ma, the voltage B is equal to:

$$(28-3.3\times1.8)=22.06\ V \quad\quad 1$$

If the beam current increases to 2.3 ma, the voltage B will drop to:

$$(28-3.3\times2.3)=20.41\ V \quad\quad 2$$

The over-current protection circuit is divided into four sections each performing a particular function. The first section provides a reference voltage A. The beam supply voltage Vb is applied to the series arrangement of resistors R13, R14 and diodes D11 and D12, diode D12 being connected to ground. The junction between resistors R13 and R14 is connected to ground via a capacitor C13 and to the base of an NPN transistor Q1. The collector of transistor Q1 receives the beam supply voltage Vb, while the emitter is connected to ground via a resistor R15. The reference voltage A appears at the emitter of transistor Q1. The diodes D11 and D12 are used for temperature compensation so that the reference voltage A will not change with temperature.

The second section of the over-current protection circuit compares the voltage B with the reference voltage A and performs the switching function. In particular, the voltage B is applied to the base of a PNP transistor Q2 via a diode D13, and the reference voltage A is applied to the emitter of the transistor Q2, a capacitor C14 interconnecting the base and the emitter. If the voltage B is lower than the reference voltage A by the sum of the forward voltage drop of diode D13 and the base-emitter voltage drop of transistor Q2, transistor Q2 will turn on and apply a potential to the series arrangement of resistors R16 and R17 connected to ground.

The third section of the over-current protection circuit includes a diode D14 connected to the junction between resistors R16 and R17, and the parallel arrangement of a capacitor C15, a diode D15 and a resistor R18 coupled across the combination of diode D14 and resistor R17. This third section rectifies the voltage at the junction of resistors R16 and R17, and serves to block interference due to picture tube arcing and random noises.

The fourth section of the over-current protection circuit is the output stage. The diode D14 is connected, on the one hand, via a resistor R19 to the collector of a PNP transistor Q3 and, on the other hand, to the base of an NPN transistor Q4. A resistor R20 connects the emitter of transistor Q4 to the grounded end of resistor R17, while a resistor R21 connects the collector of transistor Q4 to the base of transistor Q3. The parallel arrangement of a resistor R22 and a capacitor C16 connects the base of transistor Q3 to its emitter, which is connected, on the one hand, via a resistor R23 to a power supply source Vc, and, on the other hand, via diode D16 to the ON/OFF input of the high voltage generator 50, which also receives an ON/OFF voltage via a resistor R24. The rectified voltage at diode D14 turns on transistors Q3 and Q4, while the diode D15 protects transistor Q4 from reversed base-emitter voltage breakdown. Transistors Q3 and Q4 are arranged in such a configuration that the voltage at the ON/OFF input of the high voltage generator 50 will be clamped to approximately 0 volts by the diode D16 when transistors Q3 and Q4 are turned on. This clamping action is continued even when the voltage at the junction between resistors R16 and R17 drops to zero. The clamping action by the diode D16 is only released when the power supply voltage Vc is interrupted for a few seconds. When the voltage at the ON/OFF input of the high voltage generator 50 is at zero voltage potential, the high voltage generator 50 is disabled, and as such, there is no beam current.

The following equation may be used to calculate the total amount of beam current I before the over-current protection circuit acts and shuts down the high voltage generator 50:

$$(Vb\times R13+Vd(R13+R14))/R11(R13+R14) \quad\quad 3$$

Eq. 3 assumes that the base-emitter voltages of transistors Q1 and Q2 are the same as the forward diode voltage, Vd, of the diodes D11, D12 and D13. As such, Vd is approximately 0.6 V.

In addition, once the value of resistor R11 is chosen, and the ABL voltage V1 is known for the maximum current, Ib (e.g., 1.8 ma), the value of resistor R12 can be determined using the equation:

$$Ib=(Vb-Vl)/R11+R12) \qquad 4$$

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. An over-current protection circuit for preventing damage to a television receiver due to excessive beam current, said television receiver including a high voltage generating circuit for supplying a beam current to a picture tube, said high voltage generating circuit having a control input, wherein said over-current protection circuit comprises:

means for directly detecting the beam current;

means for comparing the detected beam current with a predefined threshold level; and means, coupled to the control input of said high voltage generating circuit, for generating a control signal, in dependence on said comparing means, for turning off said high voltage generating circuit.

2. The over-current protection circuit as claimed in claim 1, wherein said control signal generating means comprises means for latching said high voltage generating circuit in an off state.

3. The over-current protection circuit as claimed in claim 1, wherein said over-current protection circuit further comprises:

means for generating a reference signal equivalent to said threshold level; and temperature compensating means for making said reference signal temperature independent.

4. The over-current protection circuit as claimed in claim 1, wherein said over-current protection circuit further comprises:

means for preventing said control signal generating means from erroneously generating said control signal due to picture tube arcing and/or random noise.

5. The over-current protection circuit as claimed in claim 1, wherein said means for directly detecting the beam current comprises:

a voltage supply coupled to said high voltage generating circuit for supplying said beam current; and a measuring resistor in series with said voltage supply and said high voltage generating circuit, wherein a voltage across said measuring resistor is proportional to the beam current.

6. The over-current protection circuit as claimed in claim 3, wherein said means for generating a reference signal comprises:

a voltage supply for supplying a constant voltage;

a resistance divider coupled to said voltage supply; and a transistor having a base coupled to an interconnecting node of said resistance dividers a collector coupled to said voltage supply, and an emitter for supplying said reference signal.

7. The over-current protection circuit as claimed in claim 6, wherein said temperature compensating means comprises a series arrangement of diodes connecting said resistance divider to ground.

8. The over-current protection circuit as claimed in claim 2, wherein said control signal generating means comprises:

a first transistor coupled to an output of said comparing means;

a second transistor coupled to said first transistor; and a voltage source coupled to said second transistor, wherein said latching means connects said second transistor to said control input of said high voltage generating circuit, whereby when said detected beam current is greater than said predefined threshold level, said comparing means turns on said first transistor which, in turn, turns on said second transistor thereby dropping a voltage at said control input to substantially a zero voltage potential.

* * * * *